No. 698,291. Patented Apr. 22, 1902.
W. H. KEMPER.
GATE.
(Application filed Oct. 25, 1900.)
(No Model.) 2 Sheets—Sheet 1.

Witnesses
Ralph A. Shepard.
N. C. Chandler

W. H. Kemper Inventor
By

No. 698,291. Patented Apr. 22, 1902.
W. H. KEMPER.
GATE.
(Application filed Oct. 25, 1900.)
(No Model.) 2 Sheets—Sheet 2.

Witnesses
Ralph A. Shepard

W. H. Kemper Inventor
By
Attorneys

UNITED STATES PATENT OFFICE.

WILLIAM H. KEMPER, OF DANVILLE, KENTUCKY.

GATE.

SPECIFICATION forming part of Letters Patent No. 698,291, dated April 22, 1902.

Application filed October 25, 1900. Serial No. 34,322. (No model.)

*To all whom it may concern:*

Be it known that I, WILLIAM H. KEMPER, a citizen of the United States, residing at Danville, in the State of Kentucky, have invented certain new and useful Improvements in Gates; and I do hereby declare the following to be a full, clear, and exact description of the invention, such as will enable others skilled in the art to which it appertains to make and use the same.

This invention relates to gates in general, and more particularly to that class known as "farm-gates" and which are adapted to be opened and closed without it being necessary for the operator to leave his vehicle.

The object of the invention is to provide a device which will be simple and cheap of construction and which, moreover, will be easy of operation.

Figure 1:
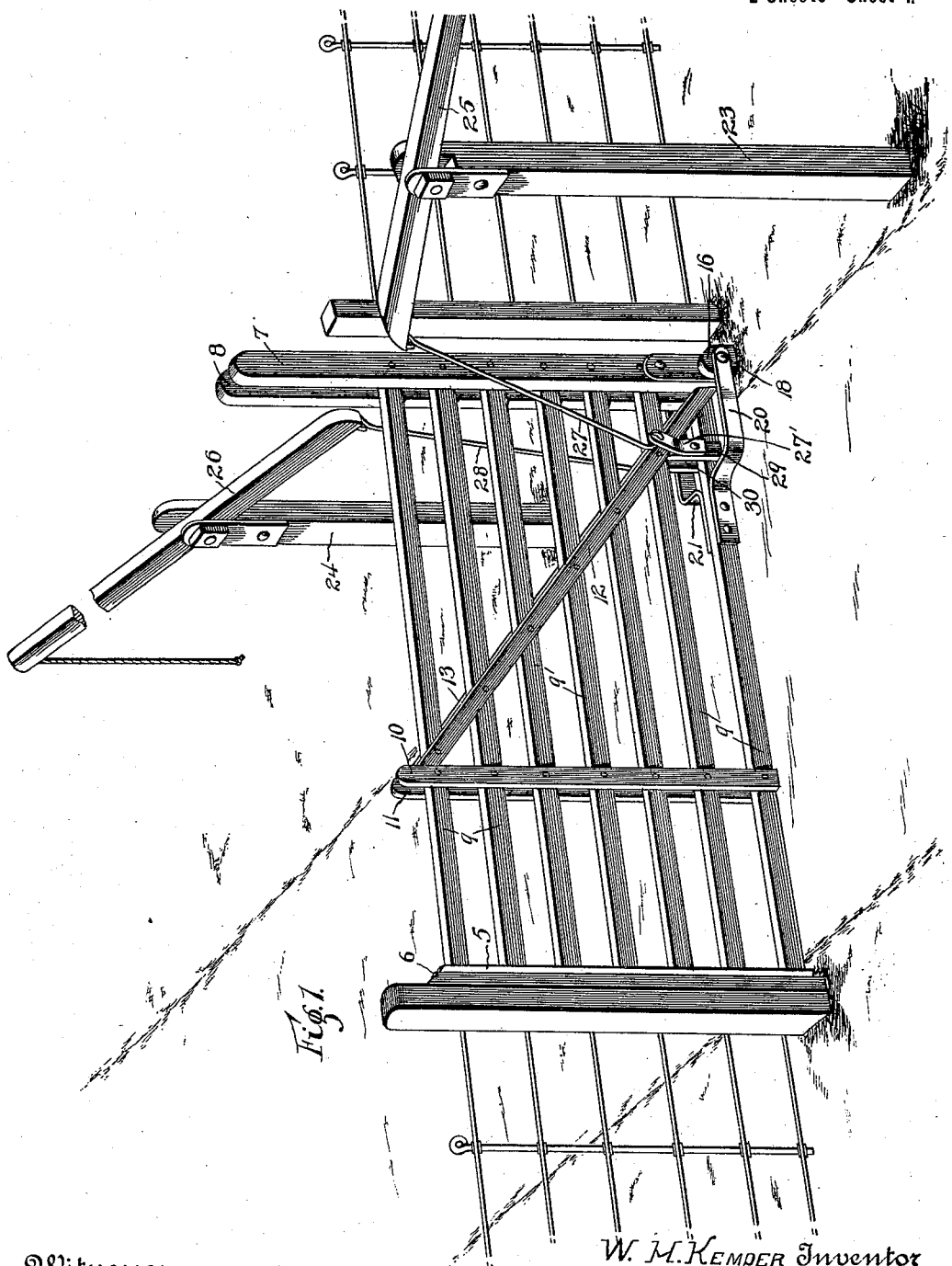
Figure 2:
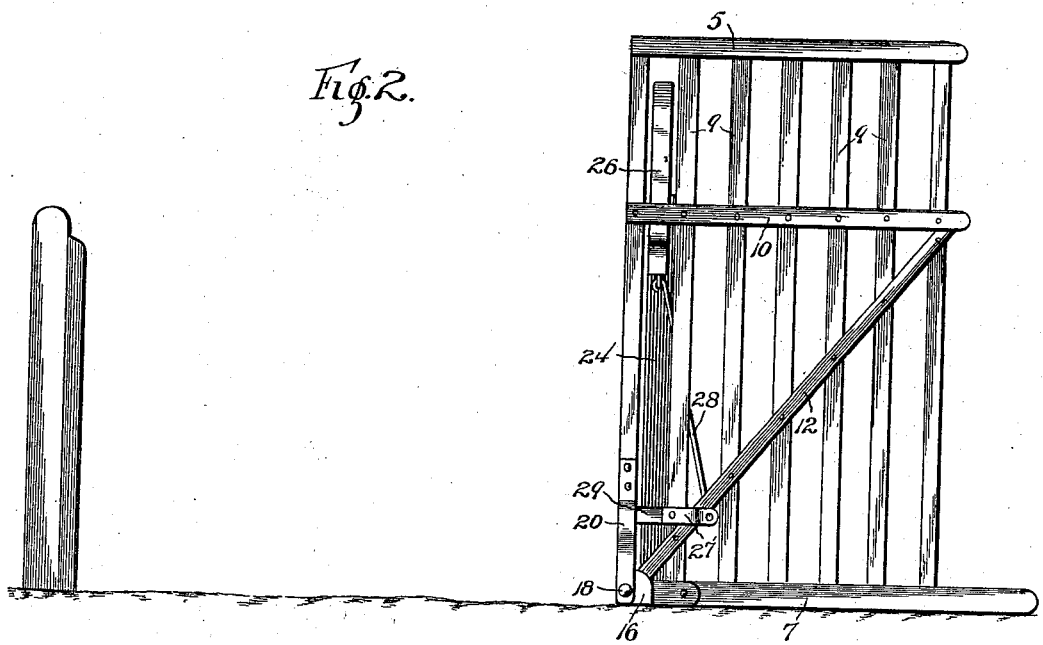
Figure 3:
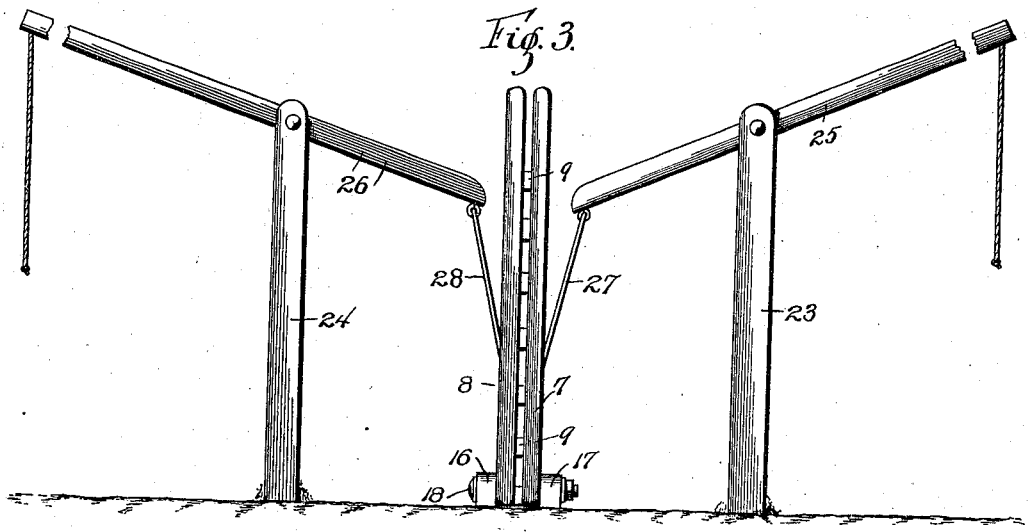

In the drawings forming a portion of this specification, and in which like numerals of reference indicate similar parts in the several views, Figure 1 is a perspective view showing the complete gate. Fig. 2 is a side elevation showing the gate in an open position. Fig. 3 is an end view of the gate.

Referring now to the drawings, the gate proper comprises front uprights 5 and 6 and rear uprights 7 and 8. Rails 9 have their front ends secured between the uprights 5 and 6 and their rear ends secured between the rear uprights 7 and 8. Additional uprights 10 and 11 are secured one on each side of the rails and adjacent the uprights 5 and 6, and extending from the upper ends of the uprights 10 and 11 to the lower ends of the uprights 7 and 8 are braces 12 and 13, one of which is disposed on each side of the gate.

Upon a suitable base are formed ears 16 and 17 and provided with alining perforations, the gate being disposed with its rear lower corner between the ears 16 and 17, to which the gate is pivotally connected by means of a pivot-pin 18, passed through the perforations in the ears and through a corresponding perforation in the lower ends of the rear uprights 7 and 8. Metal bearing-plates are attached to the outer faces of the rear uprights at their lower ends to receive the wear of the pivot-pin and support the weight of the gate when it is being tilted. The pivot-pin extends beyond the ears 16 and 17, and pivoted upon this pin are plates 20 and 21, the opposite ends of which are bent inwardly and are then extended parallel and bolted to the side faces of the bottom rail of the gate. These plates 20 and 21 act to brace the structure, and thus prevent lateral swinging of the gate as it is swung from one position to another upon its pivot.

In order to oscillate the gate, and thus to open and close it, uprights 23 and 24 are disposed at opposite sides of the pivoted end of the gate, which uprights have their upper ends bifurcated for the reception of levers 25 and 26, which are pivoted therein. The ends of the levers 25 and 26 adjacent the gate are connected thereto through the medium of links 27 and 28, these links being in turn pivotally connected with the gate. The pivotal connection of the links with the gate is made directly with plates 27', lying against the outer faces of the short uprights 29 and 30, the upper ends of which lie against the braces 12 and 13, while their lower ends lie against the outer face of the bottom rail, to which and the rail next above they are secured. The plates 27' are pivoted directly to the upper ends of uprights 29 and 30, and thus as the levers above referred to are drawn they act to lift the gate on its pivot until the gate has passed beyond the dead-center, when the lever is released and the weight of the gate causes it to fall to the open position.

When it is desired to close the gate, either lever is drawn downwardly and then released, when the momentum of the gate will carry it over the dead-center and to the closed position. In this rocking movement of the gate there is of course a tendency for it to move sidewise, and this tendency is overcome by the brace-plates above referred to.

It will be noticed that the braces 12 and 13 are connected directly to each rail of the gate, with the exception of the bottom one, and are connected to the latter by means of blocks 29 and 30. As the links are connected with the blocks through the medium of the plates 27', the lifting strain is distributed to each rail of the gate.

Having thus described my invention, what I claim is—

A gate comprising end uprights having horizontal rails connected thereto, additional uprights connected to all of the rails adjacent to one end of the gate, a pair of braces disposed one at each side of the rails and extending from the upper ends of the last-named uprights downwardly and rearwardly to the lower end of the upright at the rear end of the gate and connected to all of the rails, short uprights secured to the bottom rail of the gate and resting with their upper ends against the under faces of the braces, links pivoted to the short uprights and lifting means connected to the links, said gate being pivoted at the lower end of the rear upright thereof, for movement in a vertical plane.

In testimony whereof I sign my name in the presence of two subscribing witnesses.

WILLIAM H. KEMPER.

Witnesses:
E. C. COSBY,
F. P. SHEARIN.